United States Patent
De Coene

[15] 3,678,938
[45] July 25, 1972

[54] SEPARATOR DEVICE FOR COMBINE HARVESTERS

[72] Inventor: Frans J. De Coene, Zedelgem, Belgium
[73] Assignee: Clayson N.V., Zedelgem, Belgium
[22] Filed: July 27, 1970
[21] Appl. No.: 58,376

[30] Foreign Application Priority Data

July 30, 1969 Belgium....................................49,351

[52] U.S. Cl............................130/27 E, 130/27 F, 130/27 G
[51] Int. Cl.......................................................A01f 12/22
[58] Field of Search.....................130/27 R, 27 F, 27 J, 27 K, 130/27 H

[56] References Cited

UNITED STATES PATENTS 2,314,901   3/1943   Scranton..............................130/27 E Primary Examiner—Antonio F. Guida
Attorney—Joseph A. Brown, John C. Thompson, James J. Kennedy

[57] ABSTRACT

A conventional combine having a threshing cylinder and concave is provided with a beater and a separating concave and cylinder to the rear of the beater and in front of conventional straw walkers.

11 Claims, 14 Drawing Figures

SEPARATOR DEVICE FOR COMBINE HARVESTERS

FIELD OF INVENTION

The present invention deals generally with improvements to combines, especially to the threshing and separation mechanism of combines.

DESCRIPTION OF PRIOR ART

One knows that the threshing and separation mechanism of traditional combines is mainly formed by a cylinder with a concave and a shaking mechanism in the form of straw walkers behind the cylinder and concave. With this combination, the maximum capacity of a combine is limited by the shaking mechanism.

When the maximum capacity (determined by grain loss) is exceeded, a too thick straw layer is fed to the aforesaid straw walkers so that these straw walkers do not get the chance to separate all the grain which is still between this straw. The capacity may be increased by making the straw walkers wider and/or longer so that the straw which is supplied to the straw walkers is spread over a large area, and remains longer in contact with the straw walkers before leaving the machine. A disadvantage of this however is that the combine would be very big and expensive with such a wider and/or longer shaking mechanism which is not desirable of course.

SUMMARY OF INVENTION

The present invention deals with a combine which shows the same dimensions as the traditional combine, but by which at least the separation mechanism is improved so that a considerable larger amount of crop can be processed per unit of time with the same size of the machine and this with a final proportional loss which is no greater than the traditional combine. From this it appears that a considerable smaller and cheaper machine is obtained with the execution according to the present invention, which can process the same large quantity of crop per unit of time as the larger traditional combines, also with the same proportional losses. In order to realize this considerable capacity increase without enlarging the dimensions of the machine, a part of the traditional shaking mechanism is replaced according to the present invention by a mechanism of which the separation capacity is considerably greater than the separation capacity of the shaking mechanism which is normally foreseen. The improved threshing and separation mechanism for combines which shows the aforesaid and other advantages mainly consists in providing an additional separation mechanism between the proper threshing mechanism and the so called straw walkers.

BRIEF DESCRIPTION OF DRAWINGS

In order to better show the features of the present invention we describe here a preferred way of execution with reference to the enclosed drawings in which.

DESCRIPTION OF A PREFERRED MACHINE

Figure 1:
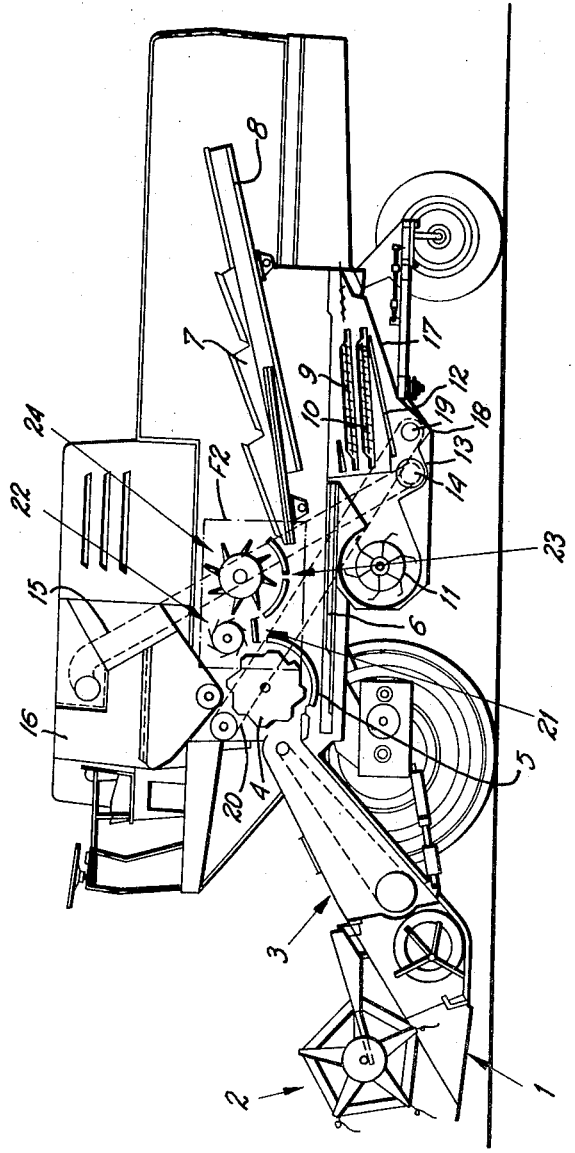
FIG. 1 is a schematical longitudinal section of a combine, equipped with a threshing, and separation mechanism according to the invention.
Figure 2:
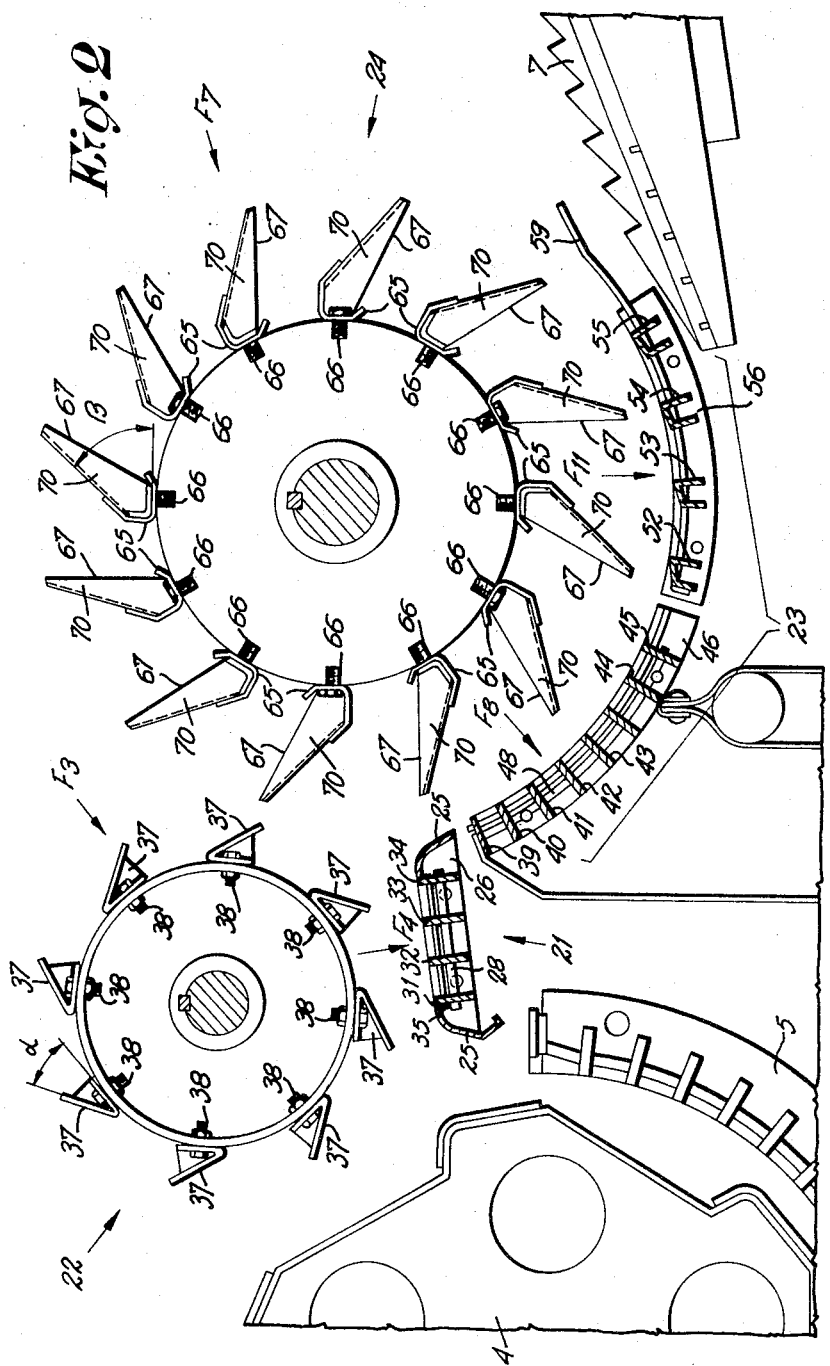
FIG. 2 is an enlarged view of the part which is indicated in drawing 1 by F 2.
Figure 3:
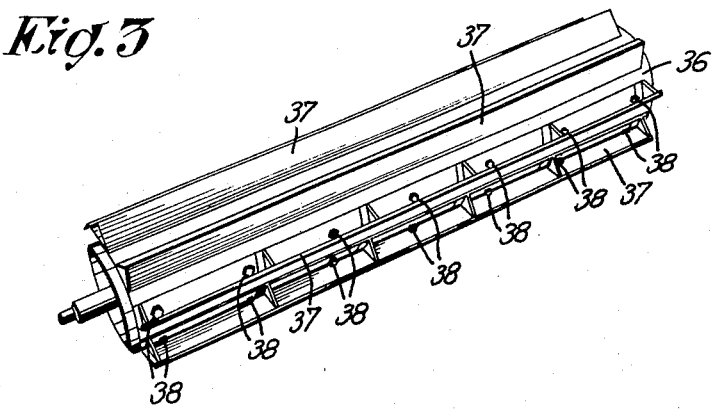
FIG. 3 is a perspective view of the straw beater.

As represented in FIG. 1, a combine on which the improvement are applied according to the invention, mainly consists of a header 1, a reel 2, a straw elevator 3, a cylinder 4 with concave 5, a grain pan 6, straw walkers 7 (under which chutes 8 are installed which end on top of the aforesaid grain pan 6), and a cleaning mechanism disposed behind the grain pan and underneath the shaking devices 7, the proper cleaning mechanism including sieves 9 and 10 and a fan 11. A sloping bottom 12 is applied underneath these sieves which lands on top of a cross auger housing 13 in which an auger 14 is installed, the auger 14 displacing the material which lands in housing 13 towards an elevator 15 by which the material is conveyed in grain tank 16 eventually via a levelling auger.

A second bottom 17 is applied underneath the aforesaid bottom 12 and material which lands on the bottom 12 falls on a second cross auger housing 18 in which an auger 19 is also applied. The latter displaces the material which lands in housing 18 towards an elevator 20 which conveys the material in front of cylinder 4.

All these elements are traditionally present in a combine by which according to the invention, only one difference is to be observed in the execution of the shaking mechanism 7, namely that it is of a shorter execution, especially, that a part of the traditional shaking mechanism is dropped between the front end of this shaking mechanism and cylinder 4 and a space is left between which an additional separation mechanism is applied according to the invention.

As known the cut crop is transported to the threshing mechanism 4–5 via the aforesaid elevator 3 where it is threshed. The grain together with the impurities falls on grain pan 6 while the straw amongst which there is still grain, with the traditional executions, directly lands on the shaking mechanism 7 where this last quantity of grain is practically completely separated from the straw and is transported via the aforesaid chutes 8 towards grain pan 6 in order to pass in a known way, via the cleaning mechanism 9–10–11 which sees to it that light particles such as chaff, are removed from the material. Further, the material is fed via the grain elevator 15 and conveyed into grain tank 16. Although the aforesaid threshing mechanism 4–5 could thresh a greater quantity of crop per unit of time, in other words that the combine could be displaced with a greater speed in the field, this quantity of crop is limited by the so called straw walker losses which occur with such a traditional formed combine. Indeed, these straw walker losses must remain beneath a certain per cent of the threshed grain quantity.

According to the invention, a forward part of the shaking mechanism 7 is deleted, and a novel separation mechanism is substituted therefore, the novel mechanism separating the grain from the straw quicker and more efficiently than is the case with the traditional shaking mechanism so that a greater quantity of crop can be processed without an increase of the straw walker losses.

In this way one obtains for one and the same duration of time, a yield which can be 30–40 percent greater in specific cases without effecting an increase of the proportional losses.

Figure 4:
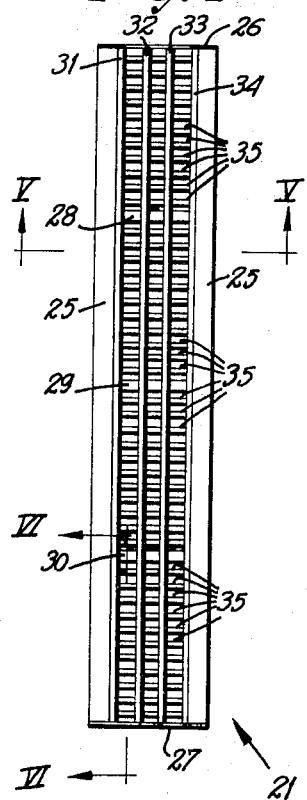
FIG. 4 is a view taken along the arrow F4 in FIG. 2.
Figure 5:
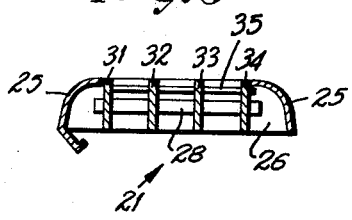
FIGS. 5 and 6 are respectively cross sections according to lines V — V and VI — VI in FIG. 4.
Figure 6:
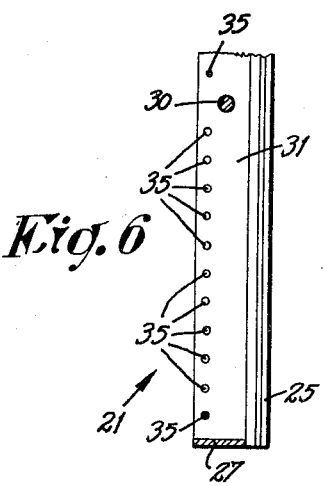

In order to obtain the aforesaid and other advantages according to the present improvements, an intermediate part 21 is applied behind the aforesaid concave 5 on top of which a so called straw beater 22 is installed which is of a specific construction according to the invention, whilst a concave 23 is installed behind the aforesaid intermediate part 21 which directly lands on top of the front part of the aforesaid shortened shaking mechanism 7 and by which an additional separation cylinder 24 is installed on top of concave 23. The aforesaid intermediate part 21 will preferably be formed as reflected in FIGS. 4 through 6 by a grate which is fixed between the side walls of the combine and at a specific distance from the aforesaid straw beater 22.

The intermediate part or grate 21 mainly consists of two longitudinal guide walls 25 which are connected with each other by end cross girders 26–27 and intermediate girders 28–29 and 30. Further slat shaped longitudinal girders, respectively, 31–32–33 and 34 are installed between the end cross girders 26–27 by which these slats 31 to 34 are kept by them at mutual equal distances for example by welding and by connecting them with the girders 28–29 and 30 which pass through these slats. Finally, threads or bars 35 are applied at mutual regular distances between the aforesaid slat shaped longitudinal girders 31 to 34. In this way, one obtains a grate over which the straw which comes from the threshing mechanism can pass and by which openings are formed between the longitudinal girders 31 to 34 on one hand and the cross bars 35 on the other hand, chosen judiciously in order to enable the grain and small particles to fall through on one hand and to prevent the passage of straw and large particles on the other hand. The straw beater 22 is installed on top of part 21 which sees to it that the straw which comes from the threshing mechanism is forced to pass over the intermediate part 21. In this execution, this straw beater is formed by a tube shaped body 36 on which deflector plates 37 are ridgidly secured at mutual regular distances, for example by means of bolts 38. The deflector plates are of a longitudinally extending rectangular shape and are at an acute angle in trailing relation to the radius in the direction of rotation. In the present execution according to the invention, this beater 22 has a double purpose, namely further displacement and transport of straw which leaves the threshing mechanism 4,5 on one hand, and the additional processing of this straw on the other hand. For this purpose, these deflector plates 37 are fixed at a specific angle on body 36, because it has been established experimentally that in case of a badly chosen angle, either the straw is crushed by which much short straw interferes in the cleaning mechanism and by which the latter is overloaded, which results in a bad cleaning; or that the straw turns around the straw beater.

Figure 8:
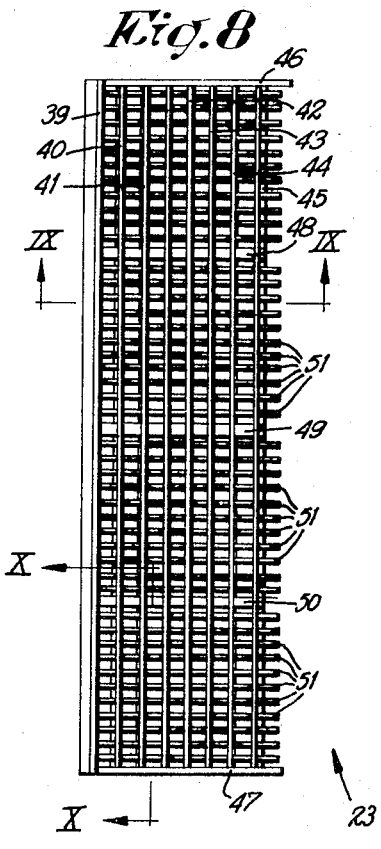
FIG. 8 is a view of the forward portion of the second concave taken along the arrow F8 in FIG. 2.
Figure 9:
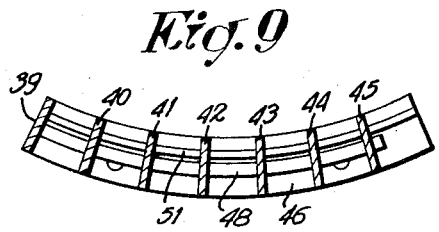
FIGS. 9 and 10 are respectively cross sections according to the lines IX — IX and X — X in FIG. 8.
Figure 10:
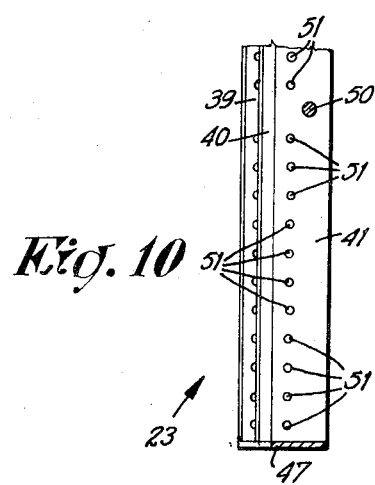
Figure 11:
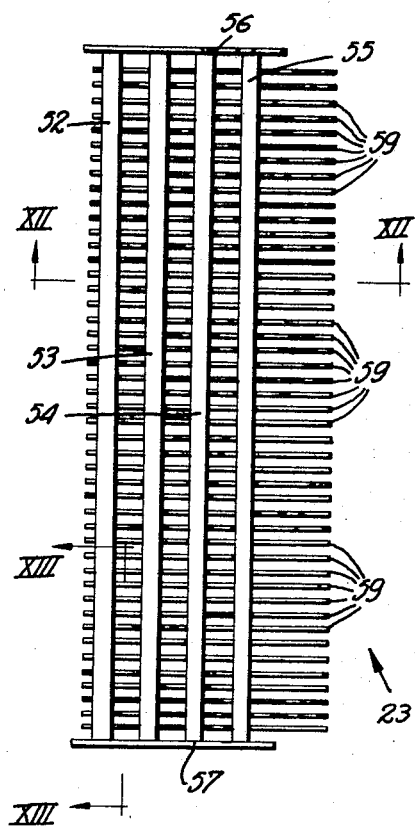
FIG. 11 is a view of the rear portion of the second concave taken along the arrow F11 in FIG. 2.
Figure 12:
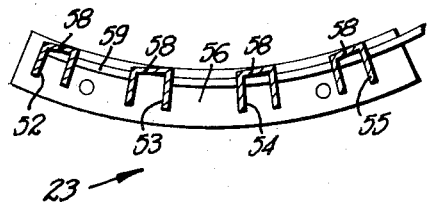
FIGS. 12 and 13 are respectively sections according to lines XII — XII and XIII — XIII in FIG. 11.
Figure 13:
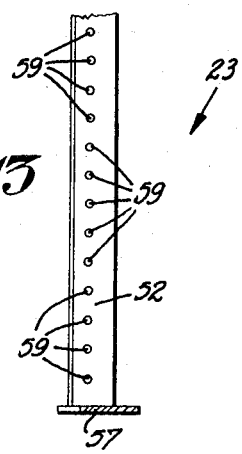

The aforesaid concave 23 which is installed behind the aforesaid intermediate part 21 and which lands on top of the front part of the shortened shaking mechanism 7 is formed according to this execution by two main parts, namely a front part or forward portion which is reflected in FIGS. 8 to 10 and a rear part or rearward portion which is represented in FIGS. 11 to 13. The parts have different types of separating elements.

In this execution, the front part is formed by slat shaped longitudinal girders, respectively 39–40–41–42–43–44 and 45 which are connected with each other and are kept at mutual equal distances on one hand, by end cross girders 46 and 47 on the other hand by intermediate girders, respectively 48–49 and 50.

Girders 46 and 47 as well as girders 48–49 and 50 are curved. Passages are applied in the different slats 39–45 in order to install bars 51 at mutual regular distances with the objective to form a grate. The openings between the bars 51, on one hand and the cross slats 39 until 45 on the other hand are judiciously determined in order to permit the grain and small particles to fall through such a grate while large parts such as straw and the like are forced to move over this grate.

The second part Of the aforesaid concave 23 (FIGS. 11–13) mainly consist of vice versa U shaped longitudinal girders, respectively 52–53–54 and 55, by which these longitudinal girders are connected with each other and are kept at mutual equal distances by end cross girders, respectively 56 and 57, which are in the same manner as the cross girders 46 and 47 of the first part of concave 23.

Finally bent bars 59 are installed through the longitudinal girders 52–55 which are extended towards the rear extreme end of concave 23 in order to be installed over a specific part on top of the aforesaid shaking mechanism 7.

The U shaped longitudinal girders 52–55 show an oblique upper face 58 which is directed upwards in the direction of the straw displacement in the combine and inclined to face slightly forward.

The side girders 26–27–46–47 and 56–57 of the aforesaid parts 21 and 23 are each provided with for instance holes of which the concerned parts can be fixed in the combine.

Naturally these parts 21–23 can be installed adjustable towards beater 22 on one hand and towards cylinder 24 on the other hand, by which for this objective grooves or the like can be applied in the supports in which these elements are suspended.

Cylinder 24 includes five cylindrical discs, respectively 60–61–62–63 and 64 on which a suitable number of cross girders 65 are fixed, for instance by means of screw bolts 66, which co-ordinate with screw thread holes in the corresponding discs 60–64.

Tines 67 are secured on each of the aforesaid longitudinal girders 65 for instance by welding, by which the tines of the even longitudinal girders 65 are moved as such towards the tines of the uneven longitudinal girders 65 that the tines of the even girders in projection are installed between two tines of the uneven girders and vice versa.

Figure 7:
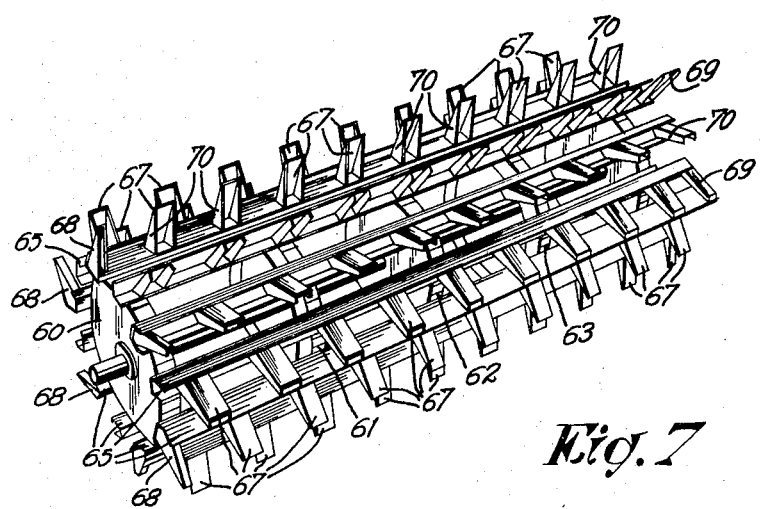
FIG. 7 is a perspective view of the second separating cylinder.

As it especially appears from FIG. 7 of the drawings, the end tine 68 of the even girders is only carried out over a width which is more or less half of the tines, whilst the end tine 69 in this case of the uneven girders is also carried out on a width which is more or less equal to the half of the normal tines.

In this execution, the size of the tines are provided with flanges 70 in order to give a greater strength to these tines. Further it is obvious that each row of tines can be of one part of deep drawn work. The tines 67–68 and 69 and the flat front surfaces have a specific rearward inclination to the direction of rotation. This inclination is experimentally established and is very important for the optimum operation, so that in case of the aforesaid beater 22, the bad choice of angle B can either cause the straw to turn around cylinder 24 or can cause the straw to be crushed.

The drive of the aforesaid beater 22 and cylinder 24 for instance takes place via chains and sprockets from the shaft of the cylinder 4.

The crop which is fed to the threshing mechanism 4–5 is transported to straw beater 22 when it is threshed by which beater 22 forces the material to displace between the aforesaid intermediate part 21 and beater 22 and by which deflector plates 37 carry out a beating movement at the same time on the straw and the grain in order that grain which is already on top of the intermediate part 21 is separated from the straw. The presence of the slats 31–34 retards the flow of the straw mat to effect a small rethreshing effect which eventually serves to release grains or the like which are still in the mat.

The material which passes the intermediate part 21 is moving rearwardly in a thin mat. Past the intermediate part 21, the material is hit downwardly by the tines of the cylinder 24, whereby the direction of the movement of the material is changed abruptly. The straw is retained by the forward part of the concave 23, while a considerable percentage of the loose grains not previously separated in the threshing means, is separated through the openings in the forward part of the separator concave as a result of the impacts of the tines thereupon.

The straw mat is conveyed further rearwardly between the tines of the cylinder 24 and the concave parts and is rubbed and beat over the aggressive girders of the forward part of the concave 23. This rubbing and beating of the material against said aggressive girders results in a certain rethreshing action upon the ears still containing some grains.

At the location of the rearward part of the concave, all ears are practically completely threshed and therefore less aggressive inverted U-shaped longitudinal girders 52 to 55 are provided for enabling the loosened grains to be separated without having further aggressive action on the material.

In this way, one obtains a combine with which an extreme great capacity is obtained for the same external dimensions.

Figure 14:
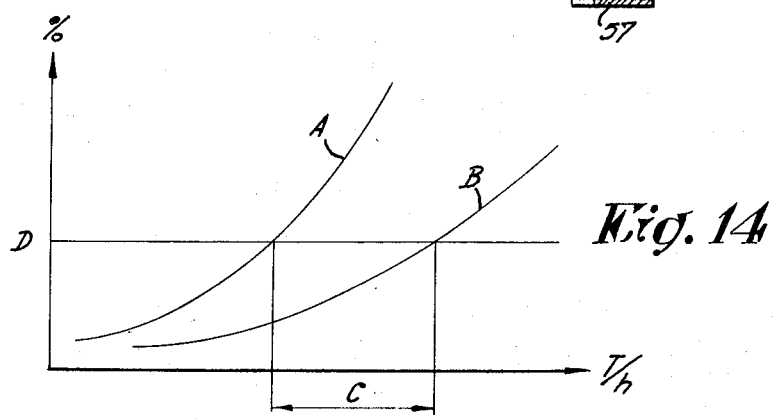
FIG. 14 is a comparative diagram showing the straw walker losses as the yield increases for both a traditional combine and a combine according to the invention, the machines having the same dimensions.

If FIG. 14, a diagram is reflected by which the straw walker losses are proportionally reflected in per cent, whilst the crop quantity which is processed by the combine is reflected in tons per hour on the horizontal line. In this drawing, one notices the logarithmic increasing loss curve A of a traditional combine on one hand, and the logarithmic increasing combine loss curve B which is provided with a device according to the invention; on the other hand. From this it appears that the loss curve B is considerably more flat than the loss curve A, so that a greater capacity is reached with one and the same loss percentage D. This capacity increase is mentioned in drawing 14 by C and can be 30-40 percent depending on the harvested crop.

Indeed the intermediate part 21 could simply be replaced in the first execution variant by a full plate which is provided or not provided with openings by which a separation could take place only between concave 23 and cylinder 24, in such a case one could also realize beater 22 in whatever way, by which this beater would only serve to transport the straw towards cylinder 24. It is also natural that the aforesaid concave 23 can be realized in one unit, for instance as in the described execution; the first part is executed either that the complete concave is realized as the second part is realized in the described execution.

As a matter of fact, such a concave can be formed completely or partly in combination or not in combination with the execution according to one of the aforesaid parts, by a sieve, a perforated plate or the like. Further, it is obvious that the aforesaid intermediate part 21 and the aforesaid concave 23 can be adjustable in height.

It is also possible to enlarge the device according to the invention for example, in order to increase the separation capacity, installing a device underneath the concave 23 which directs a wind flow on the material which comes from the separation mechanism, by which the straw and the still present grain are brought on two different levels, so that the grain is situated underneath by which the separation is still facilitated.

Finally, one will preferably install the separation device according to the invention in the combine so that the separation can take place in a simple manner. Indeed, it might be desirable in some crop conditions, to apply only the known separation device. Therefore, the above mentioned additional separation mechanism can be disassembled easily and be replaced by deleting the aforesaid part of the straw walkers 7.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A threshing and separating device for combine harvesters having a frame-work, comprising:
   a threshing concave fixed to the framework,
   a threshing cylinder rotatably mounted above the concave in cooperation with the concave to thresh croP material between the cylinder and concave and to discharge the major part of grains through the threshing concave,
   a guiding element fixed to the framework generally rearwardly of the discharge end of the threshing concave,
   a straw beater rotatably mounted on the framework and spaced above the guiding element and operable to rearwardly deflect crop material discharged by the threshing cylinder whereby said crop material is conveyed rearwardly,
   a separating concave fixed to the framework generally rearwardly and underneath the guiding element having a front end proximate to the discharge end of the guiding element,
   a separating cylinder rotatably mounted above the separating concave, and
   a plurality of laterally spaced rigid, beater means fixed to the separating cylinder in parallel relationship to the axis thereof and having laterally flat front surfaces inclined rearwardly to the direction of rotation for beating on the crop material discharged at the discharge end of the guiding element, for throwing the crop material on the separating concave and for separating the remainder of grain from the crop material through the separating concave while said crop material is further conveyed to the discharge end of the separating concave.

2. A grain threshing and separating device for combine harvesters as set forth in Claim 1 in which the straw beater has rigid rearwardly inclined deflector plates for changing the direction of movement for crop material discharged at the discharged end of the threshing concave and to convey the crop material rearwardly.

3. A threshing and separating device for combine harvesters as set forth in claim 1 in which the straw beater is provided with longitudinally extending rectangularly shaped plates at an acute angle in trailing relation to the radius of the straw beater in the direction of rotation.

4. A threshing and separating device for combine harvesters as set forth in claim 1 in which the separating concave has a forward portion and a rearward portion having different separating elements from said forward portion which facilitate in the separation of the grain.

5. A threshing and separating device for combine harvesters as set forth in claim 4 in which said forward portion has slat shaped longitudinal girders and said rearward portion has longitudinal extending surfaces facing said separating cylinder and inclined to the subscribing cylinder of said beater means.

6. A threshing and separating device for combine harvesters as set forth in claim 4 wherein said longitudinal extending surfaces are slightly inclined forward towards the approaching beater means.

7. A threshing and separating device for combine harvesters as set forth in claim 1 wherein said separating cylinder has longitudinal girders and said beater means are rigidly mounted thereon.

8. A threshing and separating mechanism for combine harvester as set forth in claim 3 in which the straw beater has a tubular shaped body and said rectangularly shaped plates are longitudinally mounted on the exterior surface.

9. A threshing and separating mechanism for combine harvesters as set forth in claim 3 wherein said guiding element comprises longitudinally extending, spaced slots and cross bars extending in the direction of rotation of said straw beater and longitudinally spaced for form openings for passing grain and preventing the passage of straw.

10. A threshing and separating device for combine harvesters having a frame-work, comprising:
    a threshing concave fixed to the framework,
    a threshing cylinder rotatably mounted above the concave in cooperation with the concave to thresh crop material between the cylinder and concave and to discharge the major part of grains through the threshing concave;
    a guiding element fixed to the framework rearward and upward of the discharge end of the threshing concave;
    a straw beater rotatably mounted on the framework and spaced above the guiding element, said straw beater has a tubular shaped body and longitudinal deflector plates mounted on the exterior surface, said plates being at an acute angle in trailing relation to the radius therethrough;
    a separating concave fixed to the framework rearward and downward to the guiding element and having a front end proximate to the discharge end of the guiding element, said concave having longitudinal surfaces facing inwardly and slightly inclined to face forwardly; and
    a separating cylinder rotatably mounted above the separating concave, said separating cylinder having longitudinally extending girders; and
    rigid, rearwardly inclined beater means rigidly fixed to said girders and having rearwardly inclined flat front surfaces for beating on the crop material discharged at the discharge end of the guiding element, for throwing the crop material on the separating concave and for separating the remainder of grains from the crop material through the separating concave in cooperation with said slightly inclined surfaces facing in the direction of said flat front surfaces while said crop material is further conveyed to the discharge end of the separating concave.

11. A threshing and separating device for combine harvesters as set forth in claim 10 wherein said separating concave has a forward part and a rearward part with said longitudinal surfaces and said forward part has a different type of separating elements from said rearward part.

* * * * *